US011226547B2

(12) United States Patent
Yang

(10) Patent No.: US 11,226,547 B2
(45) Date of Patent: Jan. 18, 2022

(54) PHOSPHOR WHEEL AND LIGHT SOURCE SYSTEM USING THE SAME

(71) Applicant: DELTA ELECTRONICS, INC., Taoyuan (TW)

(72) Inventor: Li-Cheng Yang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 16/815,024

(22) Filed: Mar. 11, 2020

(65) Prior Publication Data

US 2020/0363709 A1 Nov. 19, 2020

Related U.S. Application Data

(60) Provisional application No. 62/849,122, filed on May 16, 2019.

(30) Foreign Application Priority Data

Nov. 7, 2019 (CN) .......................... 201911080520.7

(51) Int. Cl.
  *G03B 21/20* (2006.01)
  *G02B 26/00* (2006.01)

(52) U.S. Cl.
  CPC ......... *G03B 21/204* (2013.01); *G02B 26/008* (2013.01); *G03B 21/2066* (2013.01)

(58) Field of Classification Search
  CPC ............ G03B 21/204; G03B 21/2066; G03B 21/208; G02B 26/008; F21V 9/00; F21V 9/30; F21V 9/32; F21V 9/38; F21V 13/14
  See application file for complete search history.

(56) References Cited

U.S. PATENT DOCUMENTS

| 4,725,316 A | 2/1988 | Mahany, II |
| 8,462,296 B2* | 6/2013 | Kimura ................. H04N 9/315 349/71 |
| 2010/0060822 A1 | 3/2010 | Runwen |
| 2016/0254417 A1* | 9/2016 | Morimura ............ H01L 33/508 257/98 |
| 2018/0158995 A1* | 6/2018 | Li ........................ H01L 33/501 |
| 2019/0113763 A1* | 4/2019 | Kito ..................... G02B 26/008 |

FOREIGN PATENT DOCUMENTS

| CN | 103019018 A | 4/2013 |
| CN | 103019018 B | 9/2015 |
| CN | 104566229 B | 6/2016 |
| CN | 106206904 A | 12/2016 |

(Continued)

*Primary Examiner* — Bao Q Truong
(74) *Attorney, Agent, or Firm* — CKC & Partners Co., LLC

(57) ABSTRACT

A phosphor wheel includes a substrate and a luminescence layer. The luminescence layer is disposed on the substrate and includes a glue layer, a plurality of scattering particles, and a plurality of first photoluminescence particles. The scattering particles and the first photoluminescence particles are collectively distributed in the glue layer. At least one of the scattering particles is located between the substrate and at least one of the first photoluminescence particles, and at least another of the first photoluminescence particles is located between the substrate and at least another of the scattering particles.

11 Claims, 10 Drawing Sheets

(56) References Cited

FOREIGN PATENT DOCUMENTS

| | | |
|---|---|---|
| CN | 109073204 A | 12/2018 |
| JP | 2015-121586 A | 7/2015 |
| JP | 2017-167309 A | 9/2017 |
| JP | 2017-215507 A | 12/2017 |
| JP | 2019-32506 A | 2/2019 |
| TW | 201327015 A | 7/2013 |
| TW | 201523115 A | 6/2015 |
| TW | I561614 B | 12/2016 |
| TW | I618946 B | 3/2018 |
| TW | 201833655 A | 9/2018 |
| WO | 2017/169187 A1 | 10/2017 |
| WO | 2018/225424 A1 | 12/2018 |

* cited by examiner

PHOSPHOR WHEEL AND LIGHT SOURCE SYSTEM USING THE SAME

CROSS-REFERENCE TO RELATED APPLICATION

This application claims priority to U.S. Provisional Application Ser. No. 62/849,122 filed May 16, 2019, and China Application Serial Number 201911080520.7, filed Nov. 7, 2019, the disclosures of which are incorporated herein by reference in their entireties.

BACKGROUND

Technical Field

The present disclosure relates to a phosphor wheel and a light source system using the same.

Description of Related Art

In recent years, optical projectors have been used in many fields, and the scope of applications has also gradually expanded, such as from consumer products to high-tech equipment. Various optical projectors are also widely used in schools, homes, and businesses to enlarge the display pattern provided by the signal source and display it on the projection screen. As for the light source configuration of the optical projector, the fluorescent material can be driven to emit light by a laser light source, and the characteristics of the fluorescent material and its configuration method will be related to the color gamut provided by the optical projector. However, when different colors are required, the color gamut provided by the optical projector will also be adjusted accordingly. Accordingly, how to effectively adjust the color gamut provided by an optical projector so that it can better meet the color requirements has become one of the important research and development topics at present.

SUMMARY

An aspect of the disclosure is to provide a phosphor wheel which can effectively solve the aforementioned problems.

According to an embodiment of the disclosure, a phosphor wheel includes a substrate and a luminescence layer. The luminescence layer is disposed on the substrate and includes a glue layer, a plurality of scattering particles, and a plurality of first photoluminescence particles. The scattering particles and the first photoluminescence particles are collectively distributed in the glue layer. At least one of the scattering particles is located between the substrate and at least one of the first photoluminescence particles. At least another of the first photoluminescence particles is located between the substrate and at least another of the scattering particles.

In an embodiment of the disclosure, diameters of the scattering particles are smaller than diameters of the first photoluminescence particles. The diameters of the first photoluminescence particles are in a range from 10 μm to 15 μm.

In an embodiment of the disclosure, a weight percentage concentration of the first photoluminescence particles in the luminescence layer is in a range from 3% to 35%.

In an embodiment of the disclosure, after a light beam with a wavelength in a range from 430 nm to 460 nm is incident on the luminescence layer, a first wave peak exists at a wavelength of about 450 nm in a light emission spectrum of a light beam correspondingly emitted by the luminescence layer, a second wave peak exists at a wavelength in a range from 490 nm to 540 nm in the light emission spectrum, and a ratio of a peak brightness of the first wave peak to a peak brightness of the second wave peak is in a range from 2 to 36.

In an embodiment of the disclosure, the phosphor wheel further includes a first wavelength conversion layer. The first wavelength conversion layer is disposed on the substrate or the luminescence layer and includes a plurality of second photoluminescence particles. An overlapping area formed by a vertical projection of the first wavelength conversion layer on the substrate and a vertical projection of the luminescence layer on the substrate is smaller than an area of the vertical projection of the luminescence layer on the substrate.

In an embodiment of the disclosure, the phosphor wheel further includes a second wavelength conversion layer. The second wavelength conversion layer is disposed on the luminescence layer and includes a plurality of third photoluminescence particles. The first wavelength conversion layer and the second wavelength conversion layer are respectively located at different regions on an upper surface of the luminescence layer, and at least a part of the upper surface of the luminescence layer is not covered by the first wavelength conversion layer and the second wavelength conversion layer.

According to an embodiment of the disclosure, a phosphor wheel includes a substrate and a luminescence layer. The luminescence layer is disposed on the substrate and includes a plurality of scattering particles and a plurality of first photoluminescence particles. Heights of the scattering particles relative to the substrate are different from heights of the first photoluminescence particles relative to the substrate. A particle concentration in a first block of the luminescence layer is greater than a particle concentration in a second block of the luminescence layer, and the first block is located between the substrate and the second block.

In an embodiment of the disclosure, the heights of the scattering particles relative to the substrate are smaller than the heights of the first photoluminescence particles relative to the substrate, the scattering particles are located in the first block, and the first photoluminescence particles are located in the second block.

In an embodiment of the disclosure, the heights of the scattering particles relative to the substrate are greater than the heights of the first photoluminescence particles relative to the substrate, the first photoluminescence particles are located in the first block, and the scattering particles are located in the second block.

In an embodiment of the disclosure, the phosphor wheel further includes a first wavelength conversion layer. The first wavelength conversion layer is disposed on the substrate or the luminescence layer and includes a plurality of second photoluminescence particles. An overlapping area formed by a vertical projection of the first wavelength conversion layer on the substrate and a vertical projection of the luminescence layer on the substrate is smaller than an area of the vertical projection of the luminescence layer on the substrate.

According to an embodiment of the disclosure, a light source system includes the phosphor wheel, a light emitter, and a light reflector. The light reflector is optically coupled between the light emitter and the phosphor wheel and has a reflective surface facing the phosphor wheel.

According to an embodiment of the disclosure, a phosphor wheel includes a substrate and a luminescence layer. The luminescence layer is disposed on the substrate and includes a glue layer, a plurality of scattering particles, and a plurality of first photoluminescence particles. The scattering particles and the first photoluminescence particles are collectively distributed in the glue layer. The luminescence layer is configured to receive an excitation light and generate a modulated light. A light emission spectrum of the modulated light has a first peak brightness and a second peak brightness. The first peak brightness is greater than the second peak brightness, and a ration of the first peak brightness to the second peak brightness is in a range from 2 to 36.

In an embodiment of the disclosure, a wavelength corresponding to a peak brightness of light generated by the first photoluminescence particles after receiving the excitation light is not less than a wavelength corresponding to a peak brightness of the excitation light.

In an embodiment of the disclosure, diameters of the first photoluminescence particles are in a range from 10 μm to 15 μm, and a weight percentage concentration of the first photoluminescence particles in the luminescence layer is in a range from 3% to 35%.

In an embodiment of the disclosure, the phosphor wheel further includes a first wavelength conversion layer. The first wavelength conversion layer is disposed on the substrate or the luminescence layer and includes a plurality of second photoluminescence particles. An overlapping area formed by a vertical projection of the first wavelength conversion layer on the substrate and a vertical projection of the luminescence layer on the substrate is smaller than an area of the vertical projection of the luminescence layer on the substrate.

In an embodiment of the disclosure, a wavelength corresponding to a peak brightness of light generated by the second photoluminescence particles after receiving the excitation light is not less than a wavelength corresponding to a peak brightness of light generated by the first photoluminescence particles after receiving the excitation light.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
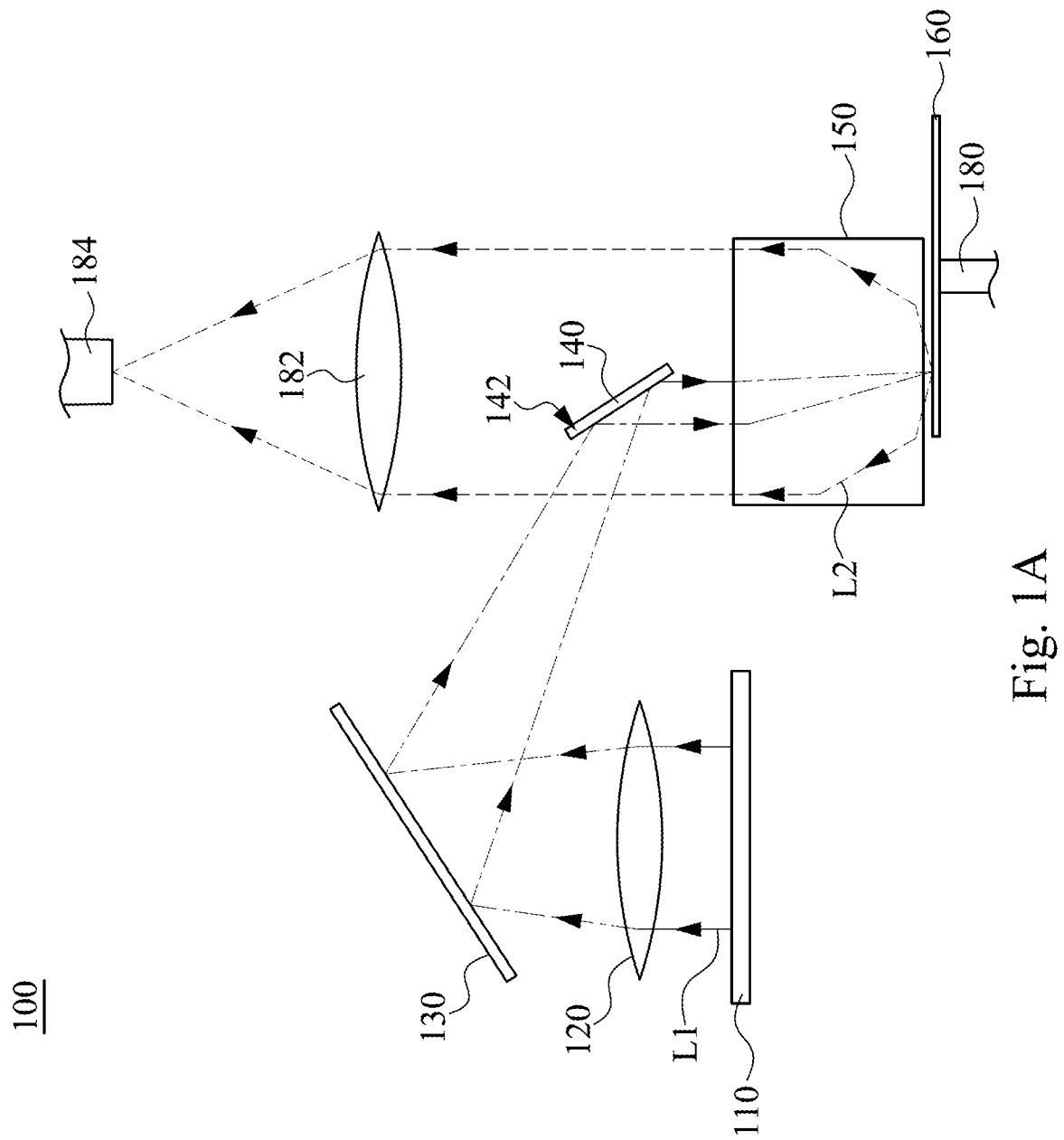
FIG. 1A is a configuration diagram of a light source system according to a first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1A. FIG. 1A is a configuration diagram of a light source system 100 according to a first embodiment of the present disclosure. The light source system 100 of the present disclosure may be applied to an optical projector so as to serve as the light source of the optical projector. The light source system 100 includes a light emitter 110, a first lens 120, a reflecting mirror 130, a light reflector 140, a lens group 150, a phosphor wheel 160, a shaft 180, a second lens 182, and an optical coupler 184.

The light emitter 110 can be used to emit a light beam L1. In some embodiments, the light emitter 110 may be a laser emitter and may provide a laser beam. The first lens 120, the reflecting mirror 130, the light reflector 140, and the lens group 150 may optically couple light between the light emitter 110 and the phosphor wheel 160, so as to guide the light beam L1 provided by the light emitter 110 to the phosphor wheel 160. Specifically, the light beam L1 provided by the light emitter 110 can transmit through the first lens 120, in which the first lens 120 may be a focusing lens to provide an effect of focusing the light beam L1. Then, the traveling direction of the light beam L1 can be turned through the reflecting mirror 130 and the light reflector 140 such that the light beam L1 can travel toward the lens group 150 and the phosphor wheel 160, in which the light reflector 140 has a reflective surface 142 facing the phosphor wheel 160.

The lens group 150 may include at least one focusing lens, diverging lens, or combinations thereof, so as to guide and focus the turned light beam L1 to the phosphor wheel 160. After receiving the light beam L1, the phosphor wheel 160 can provide a light beam L2 traveling toward the lens group 150 by at least reflection and luminescence mechanisms. In addition, the phosphor wheel 160 may be connected to the shaft 180. While the light emitter 110 provides the light beam L1, the shaft 180 connected to the phosphor wheel 160 can be driven by a motor (not shown) and drives the phosphor wheel 160 to rotate, so as to avoid accumulation of excessive heat energy on the fixed position of the phosphor wheel 160 due to exposure to the light beam L1. In some embodiments, the phosphor wheel 160 may further include a heat-dissipating plate (not shown) which may be disposed at a lower surface of the phosphor wheel 160, in which the phosphor wheel 160 is a reflective color wheel.

The second lens 182 can optically couple light between the phosphor wheel 160 and the optical coupler 184 and can be used to guide the light beam L2 from the phosphor wheel 160 to the optical coupler 184. Specifically, the light beam L2 provided by the phosphor wheel 160 may first transmit through the lens group 150 and be modulated by the lens group 150 into parallel light (i.e., parallel to the optical axis of the lens group 150), and then proceed toward the second lens 182. Then, the second lens 182 can guide the light beam L2 into the optical coupler 184 so that the light source system 100 can output the light beam through the optical coupler 184. Preferably, the optical coupler 184 is a homogeneous light tube, and the light reflector 140 is a full-spectrum mirror or a dichroic mirror.

Figure 1B:
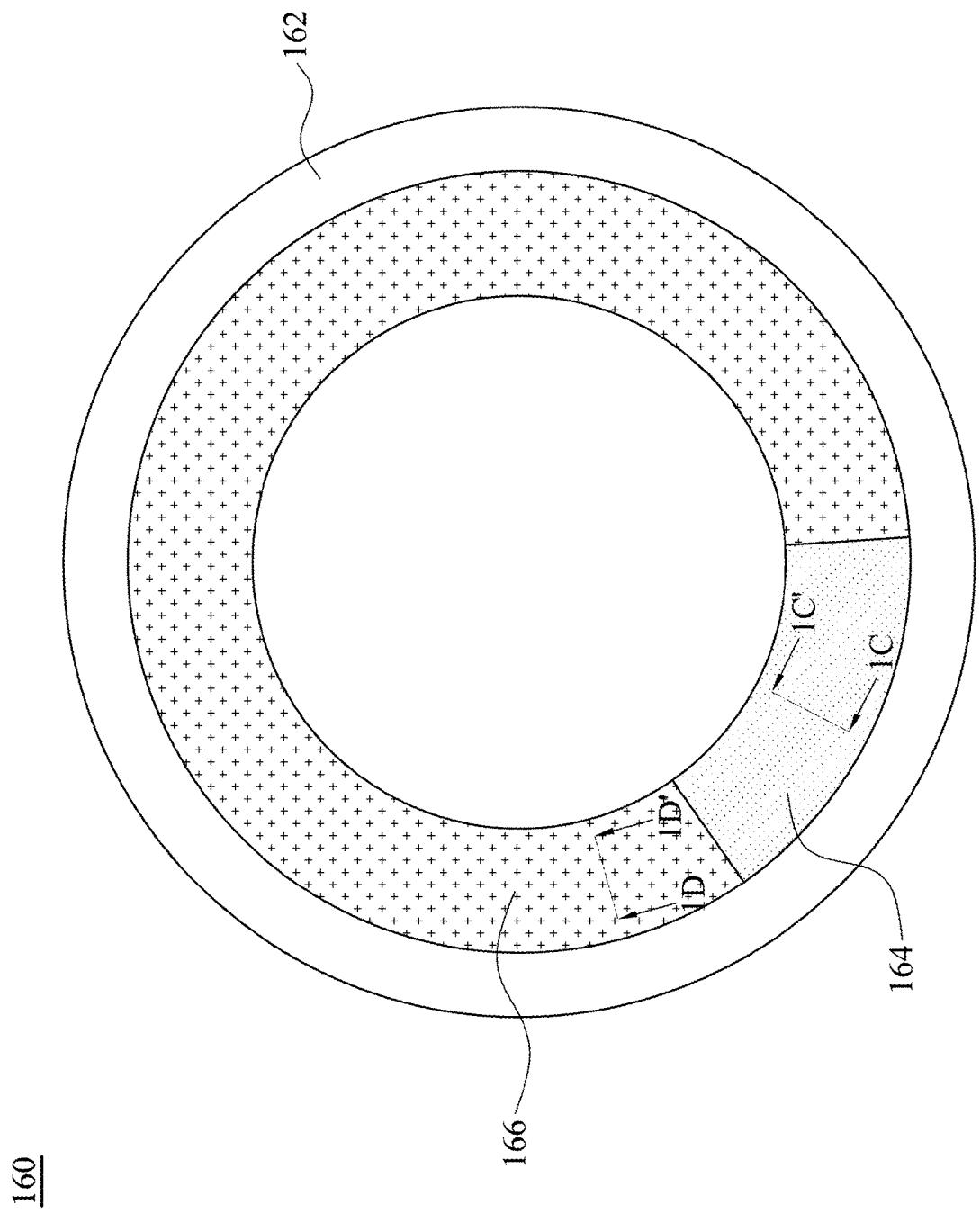
FIG. 1B is a top view of a phosphor wheel shown in FIG. 1A.
Figure 1D:
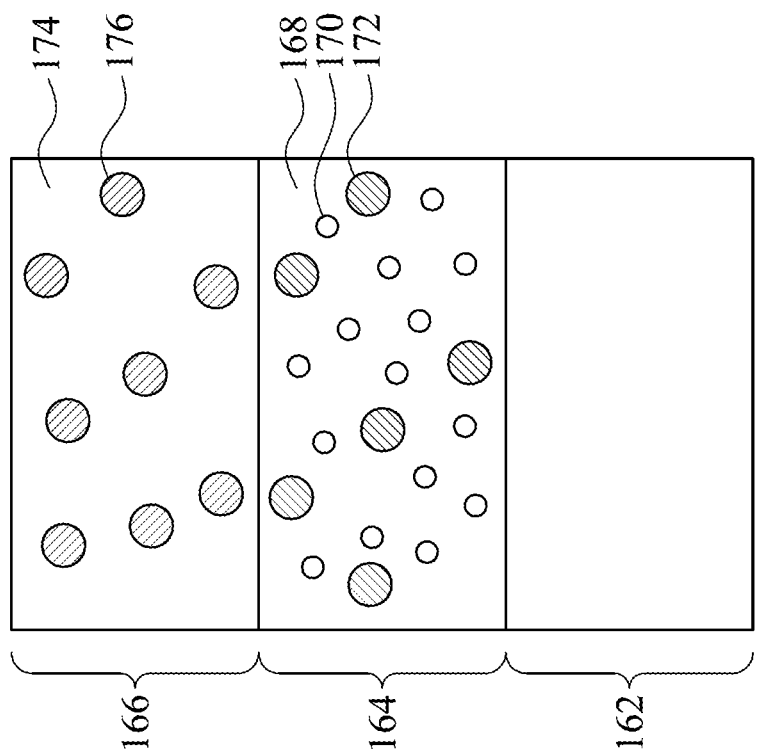
FIG. 1D is a cross-sectional view of the phosphor wheel shown in FIG. 1B taken along line 1D-1D'.
Figure 1C:
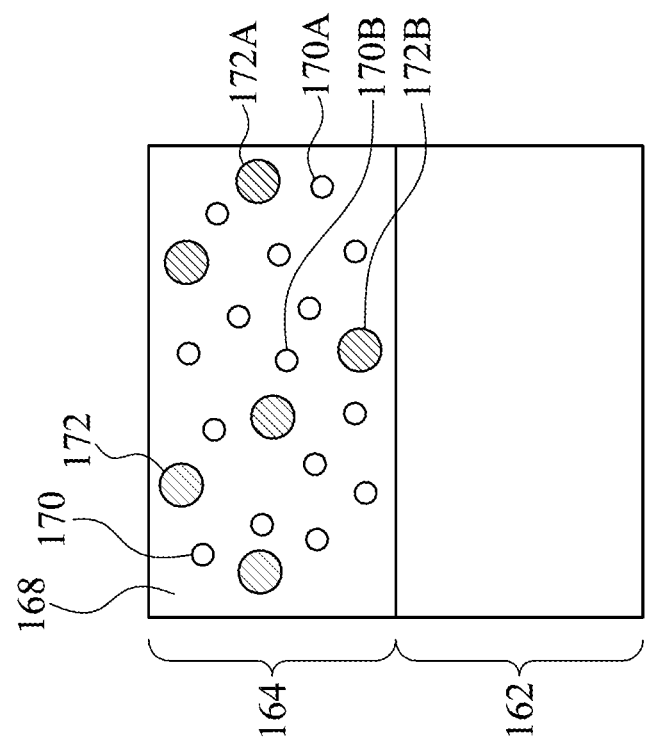
FIG. 1C is a cross-sectional view of the phosphor wheel shown in FIG. 1B taken along line 1C-1C'.

In the present disclosure, the layer configuration of the phosphor wheel 160 can be adjusted to correspondingly improve the color gamut of the light beam output by the light source system 100, which will be further described below. Reference is made to FIGS. 1B to 1D. FIG. 1B is a top view of the phosphor wheel 160 shown in FIG. 1A. FIG. 1C is a cross-sectional view of the phosphor wheel 160 shown in FIG. 1B taken along line 1C-1C'. FIG. 1D is a cross-sectional view of the phosphor wheel 160 shown in FIG. 1B taken along line 1D-1D'.

The phosphor wheel 160 includes a substrate 162, a luminescence layer 164, and a first wavelength conversion layer 166. The substrate 162 may include a metallic material or a non-metallic material, and it may be a composite structure. For example, the bottom of the substrate 162 may be made of a metallic material and the top of the substrate 162 may be made of a non-metallic material, which may be bonded by means of bonding. The non-metallic material may be, for example, a sapphire material, a glass material, a borosilicate glass material, a float borosilicate glass material, a fused quartz material or a calcium fluoride material, a ceramic material, or a combination thereof.

The luminescence layer 164 may be disposed on the substrate 162 and includes a glue layer 168, a plurality of scattering particles 170, and a plurality of first photoluminescence particles 172, and the scattering particles 170 and the first photoluminescence particles 172 are collectively distributed in the glue layer 168. In some embodiments, the scattering particles 170 and the first photoluminescence particles 172 can be firstly mixed together in a colloid and uniformly dispersed in the colloid. Then, the colloid with the scattering particles 170 and the first photoluminescence particles 172 can be coated on the substrate 162, and the colloid can be cured into a glue layer 168.

In this regard, by dispersing the scattering particles 170 and the first photoluminescence particles 172 uniformly in the colloid in the manufacturing process, the scattering particles 170 and the first photoluminescence particles 172 in the glue layer 168 are also uniformly dispersed after the colloid is cured into the glue layer 168. Furthermore, at least one of the scattering particles 170 (e.g., the scattering particle 170A) is located between the substrate 162 and at least one of the first photoluminescence particles 172 (e.g., the first photoluminescence particle 172A), and at least another of the first photoluminescence particles 172 (e.g., the first photoluminescence particle 172B) is located between the substrate 162 and at least another of the scattering particles 170 (e.g., the scattering particle 170B). Put another way, a distance from at least one of the scattering particles 170 (e.g., the scattering particle 170A) to the substrate 162 is smaller than a distance from at least one of the first photoluminescence particles 172 (e.g., the first photoluminescence particle 172A) to the substrate 162, and a distance from at least another of the first photoluminescence particles 172 (e.g., the first photoluminescence particle 172B) to the substrate 162 is smaller than a distance from at least another of the scattering particles 170 (e.g., the scattering particle 170B) to the substrate 162.

With the configuration, when a light beam (e.g., the light beam L1 as shown in FIG. 1A) is incident on the luminescence layer 164, in addition to the luminescence layer 164 reflecting the light beam through the scattering particles 170, the first photoluminescence particle 172 may be simultaneously excited by the light beam emitted from the light emitter 110 and/or the light beam reflecting by the scattering particles 170 to provide an excitation light. For example, when the physical properties of the first photoluminescence particles 172 make it possible to excite green light from blue light, the light emitter 110 emitting blue light into the luminescence layer 164 will cause the luminescence layer 164 to emit mixed light of blue and green light, or called modulated blue light. In this way, the color gamut of the light beam provided by the luminescence layer 164 can be adjusted. Here, "adjusting the color gamut of the light beam provided by the luminescence layer 164" includes adjusting the coordinates of the light beam in the color space and its brightness. Specifically, by collectively distributing the scattering particles 170 and the first photoluminescence particles 172 in the glue layer 168, in the case where the first photoluminescence particles 172 can be excited by blue light to emit green light, in addition to making the light beam provided by the luminescence layer 164 to have a larger color gamut, it is still possible to modulate the purple-oriented light beams emitted by most of the existing light emitters 110 to avoid the problem of the color of the light beams provided by the luminescence layer 164 becoming purple, such that the output beam of the light source system 100 can comply with relevant specifications.

In some embodiments, the scattering particles 170 may be titanium dioxide ($TiO_2$), zinc oxide (ZnO), boron nitride (BN), zirconium dioxide ($ZrO_2$), aluminum oxide ($Al_2O_3$), or a combination thereof. In some embodiments, the first photoluminescence particles 172 may be green phosphors, and their coordinates in the color space may be x≤0.35 and y≥0.56. In some embodiments, the first photoluminescence particles 172 may be phosphors of garnet structure of LuAG, or SiAlON, sulfide, or silicate materials. In addition, the optical properties of the light beam emitted from the luminescence layer 164 can be adjusted by adjusting the parameters of the first photoluminescence particles 172, in which the parameters of the first photoluminescence particles 172 include, for example, the particle size, the weight percent concentration in the luminescence layer 164, or other parameters.

Diameters of the scattering particles 170 are smaller than diameters of the first photoluminescence particles 172. In some embodiments, the diameters of the first photoluminescence particles 172 may be in a range from about 5 μm to about 40 μm or in a range from about 10 μm to about 15 μm. In this regard, the diameters of the first photoluminescence particles 172 and the weight percent concentration thereof in the luminescence layer 164 are at least related to the brightness of the light beam emitted by the luminescence layer 164 due to blue light irradiation.

For example, in the case where the parameters of the scattering particles 170 are unchanged, when the first photoluminescence particles 172 having a diameter of about 20 μm are used and the weight percent concentration thereof in the luminescence layer 164 is about 20%, the brightness of the light beam emitted by the luminescence layer 164 due to blue light is recorded as brightness B; when the first photoluminescence particles 172 having a diameter of about 12 μm are used and the weight percent concentration thereof in the luminescence layer 164 is about 10%, the brightness of the light beam emitted by the luminescence layer 164 due to blue light will be 1.03 times the brightness B; and when the first photoluminescence particles 172 having a diameter of about 12 μm are used and the weight percent concentration thereof in the luminescence layer 164 is about 20%, the brightness of the light beam emitted by the luminescence layer 164 due to blue light will be 1.6 times the brightness B. The above data shows that at the same weight percentage concentration, the number of particles per unit area with a diameter of 12 μm is 4 to 5 times that of 20 μm, so the closer the diameters of first photoluminescence particles 172 are to the diameters of the scattering particles 170, the better the brightness performance will be; and under the condition that the diameter is also 12 μm, a higher weight percent concentration will also have a better brightness performance, so the above parameters all reflect the brightness performance.

Figure 1E:
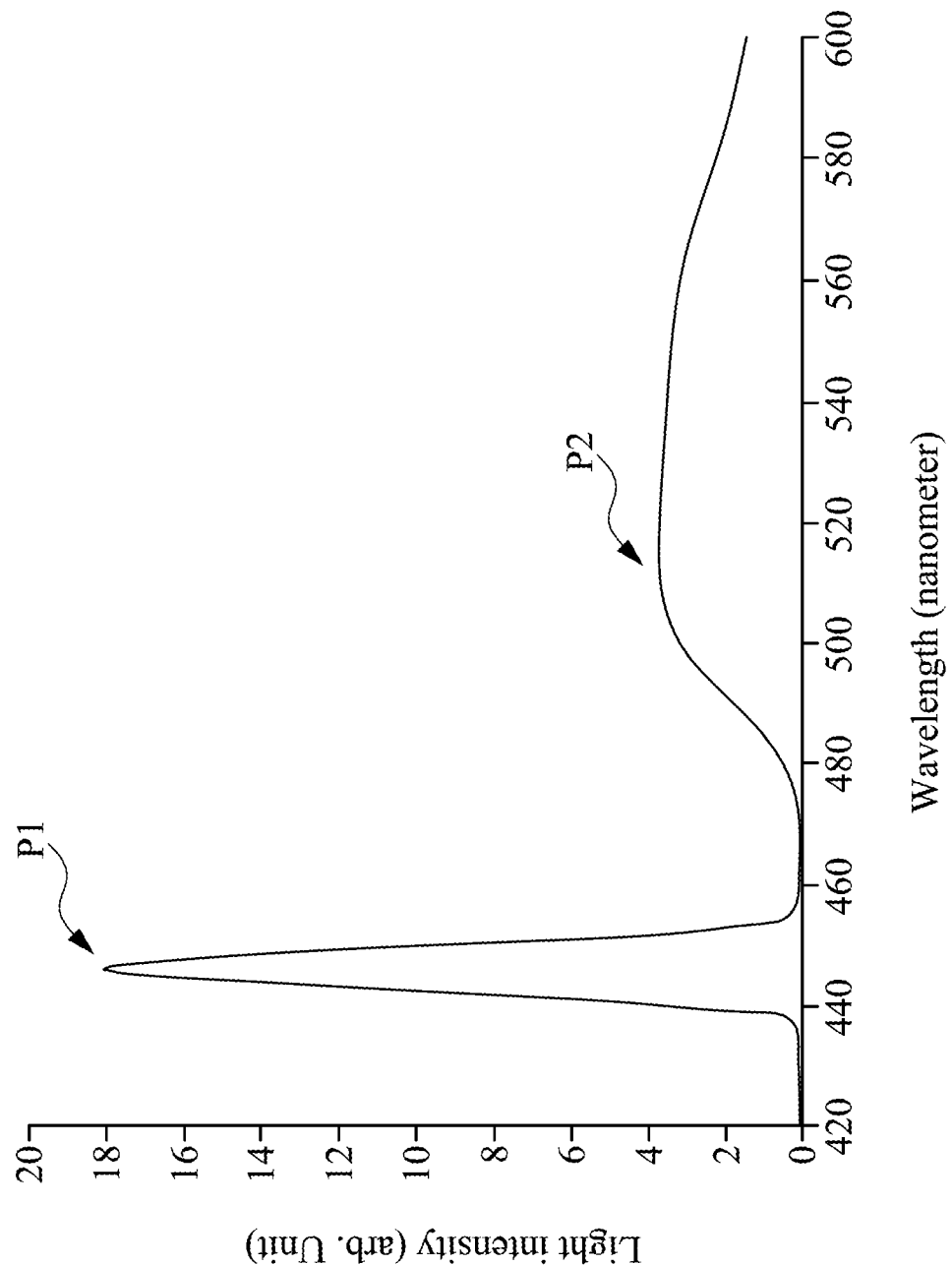
FIG. 1E is a plotted diagram of a light emission spectrum corresponding to a light beam emitted from a luminescence layer after blue light is incident on the luminescence layer.

On the other hand, the weight percent concentration of the first photoluminescence particles 172 in the luminescence layer 164 is also related to the waveform of the light beam emitted by the luminescence layer 164 due to blue light. In this regard, reference is made to FIG. 1E. FIG. 1E is a plotted diagram of a light emission spectrum corresponding to a light beam emitted from a luminescence layer after blue light is incident on the luminescence layer, in which the light emission spectrum plotted in FIG. 1E is generated by the light emitter 110 entering the luminescence layer 164 with a light beam having a wavelength in a range from 430 to 460 nm. In addition, in FIG. 1E, the horizontal axis is the wavelength and its unit is nanometer. The vertical axis is the light intensity and its unit is an arbitrary unit (arb. Unit), and its relative size relationship is represented by a numerical value.

As shown in FIG. 1E, in the light emission spectrum of the luminescence layer, a first wave peak P1 exists at a wavelength of about 450 nm and is substantially reflected by the optical spectrum of the excitation beam of the light emitter 110; a second wave peak P2 exists at a wavelength in a range from 490 nm to 540 nm and is reflected in the optical spectrum of the excited beam excited by the first photoluminescence particles, and the peak brightness of the first wave peak P1 will be greater than the peak brightness of the second wave peak P2. In this regard, when the weight percent concentration of the first photoluminescence particles (e.g., the first photoluminescence particles 172 in FIG. 1C) in the luminescence layer (e.g., the luminescence layer 164 in FIG. 1C) is adjusted, the ratio of the peak brightness of the first wave peak P1 to the peak brightness of the second wave peak P2 can be adjusted together. Specifically, the relationship between "the weight percent concentration of the first photoluminescence particles in the luminescence layer" and "the ratio of the peak brightness of the first wave peak to the peak brightness of the second wave peak" shows a negative correlation. For example, when the weight percent concentration of the first photoluminescence particles in the luminescence layer is adjusted to be in a range from 3% to 35%, the ratio of the peak brightness of the first wave peak P1 to the peak brightness of the second wave peak P2 can be adjusted to be in a range from 36 to 2, and such a ratio will let the light beam output by the light source system to meet the specifications. In some embodiments, the ratio of the peak brightness of the first wave peak P1 to the peak brightness of the second wave peak P2 can also be adjusted to be in a range from 4 to 6, which is the output performance of better color and brightness used in a projector. When the weight percent concentration of the first photoluminescence particles in the luminescence layer is less than 3% or greater than 35%, the color presented will become purple or green, which does not meet the color requirements required by the projector.

Referring back to FIGS. 1B, 1C, and 1D. The first wavelength conversion layer 166 is disposed on the luminescence layer 164, such that the luminescence layer 164 is located between the substrate 162 and the first wavelength conversion layer 166. That is, a distance between the luminescence layer 164 and the light reflector (e.g., the light reflector 140 as shown in FIG. 1A) will be greater than a distance between the first wavelength conversion layer 166 and the light reflector (e.g., the light reflector 140 as shown in FIG. 1A). Indirectly, the first wavelength conversion layer 166 is closer to the light emitter 110 than the luminescence layer 164 on the optical path.

The first wavelength conversion layer 166 may include a glue layer 174 and a plurality of second photoluminescence particles 176. The second photoluminescence particles 176 are distributed in the glue layer 174, and the second photoluminescence particles 176 and the first photoluminescence particle 172 will generate same or different color light after being excited. For example, in a case where the first photoluminescence particles 172 are excited by blue light and emit green light, the second photoluminescence particles 176 may be excited by blue light and emit red light. In some embodiments, the second photoluminescence particles 176 may include a wavelength conversion material having a peak brightness corresponding to a wavelength range of 490 to 650 nm, such as yellow phosphor, green phosphor, or red phosphor.

In addition, a vertical projection of the first wavelength conversion layer 166 on the substrate 162 and a vertical projection of the luminescence layer 164 on the substrate 162 overlap each other and form an overlapping area, and the overlapping area is smaller than an area of the vertical projection of the luminescence layer 164 on the substrate 162. That is, the shape of the luminescence layer 164 in top view will be a complete ring shape, and the shape of the first wavelength conversion layer 166 in top view will be a partial ring shape with a notch, such that at least a part of the luminescence layer 164 is not covered by the first wavelength conversion layer 166. In other aspects, multiple gaps can also be formed as required to obtain more modulated blue light from a time sequence when the shaft 180 rotates.

In this configuration, when the phosphor wheel 160 is irradiated with blue light, the luminescence layer 164 not covered by the first wavelength conversion layer 166 will provide mixed light of blue light and green light, while the first wavelength conversion layer 166 will provide red light, in which the luminescence layer 164 covered by the first wavelength conversion layer 166 can be used as a reflective substrate for the first wavelength conversion layer 166. In other alternative embodiments, when the material of the substrate 162 has sufficient reflection ability or there are special considerations, the first wavelength conversion layer 166 may also be directly disposed on the substrate 162 (not shown) instead of being disposed on the luminescence layer 164, but these alternative embodiments are relatively complicated in terms of manufacturing processes. Since the principle of wavelength conversion is to convert light with a shorter wavelength to light with a longer wavelength through the material, the light generated by the first wavelength conversion layer 166 can be reflected to a certain extent by the luminescence layer 164 with the structure of FIG. 1D. Even if the light beam of the light emitter 110 transmits through the first wavelength conversion layer 166 and reaches the luminescence layer 164 and generates modulated blue light, such modulated blue light can also excite the first wavelength conversion layer 166 to generate red light. Therefore, when the parameters of the first photoluminescence particles 172 in the luminescence layer 164 are adjusted, the optical properties of the red light generated by the first wavelength conversion layer 166 will not be affected too much. For example, when the weight percent concentration of the first photoluminescence particles 172 in the luminescence layer 164 is adjusted to 0%, the coordinates (x, y) of the red light provided by the first wavelength conversion layer 166 in the color space will be (0.650, 0.3424); and when the weight percent concentration of the first photoluminescence particles 172 in the luminescence layer 164 is adjusted to 20%, the coordinates (x, y) of the red light provided by the first wavelength conversion layer 166 in the color space will be (0.6498,0.3425). In other words, when adjusting the parameters of the first photoluminescence particles 172 in the luminescence layer 164 to adjust the optical characteristics of the light beam emitted by the luminescence layer 164, the optical properties of the red light provided by the first wavelength conversion layer 166 will not be affected too much, such that it is beneficial to simplify the parameter design of the first photoluminescence particles 172.

Although the above embodiments are described by taking emitting blue light into the luminescence layer and using the first photoluminescence particles that emit green light after being excited as an example, the disclosure is not limited in this regard. The properties of the luminescence layer can also be adjusted according to actual needs. In other embodiments, the first photoluminescence particles of the luminescence layer may generate colored light other than green light after being excited by blue light. Alternatively, the first photoluminescence particles may be excited by colored light other than blue light, such as ultraviolet light, to generate colored light in the visible light band. In addition, the second photoluminescence particles of the first wavelength conversion layer may also include a material that generates yellow light or red light, or a material equivalent to the first photoluminescence particles after being excited by light. The principle of selecting material is such that the wavelength corresponding to the peak brightness of the light generated by exciting the second photoluminescence particles is not less than the wavelength corresponding to the peak brightness of the light generated by the first photoluminescence particles, and the wavelength corresponding to the peak brightness of the light generated by exciting the first photoluminescence particles is not less than the wavelength corresponding to the peak brightness of the light emitted by the light emitter.

Figure 2A:
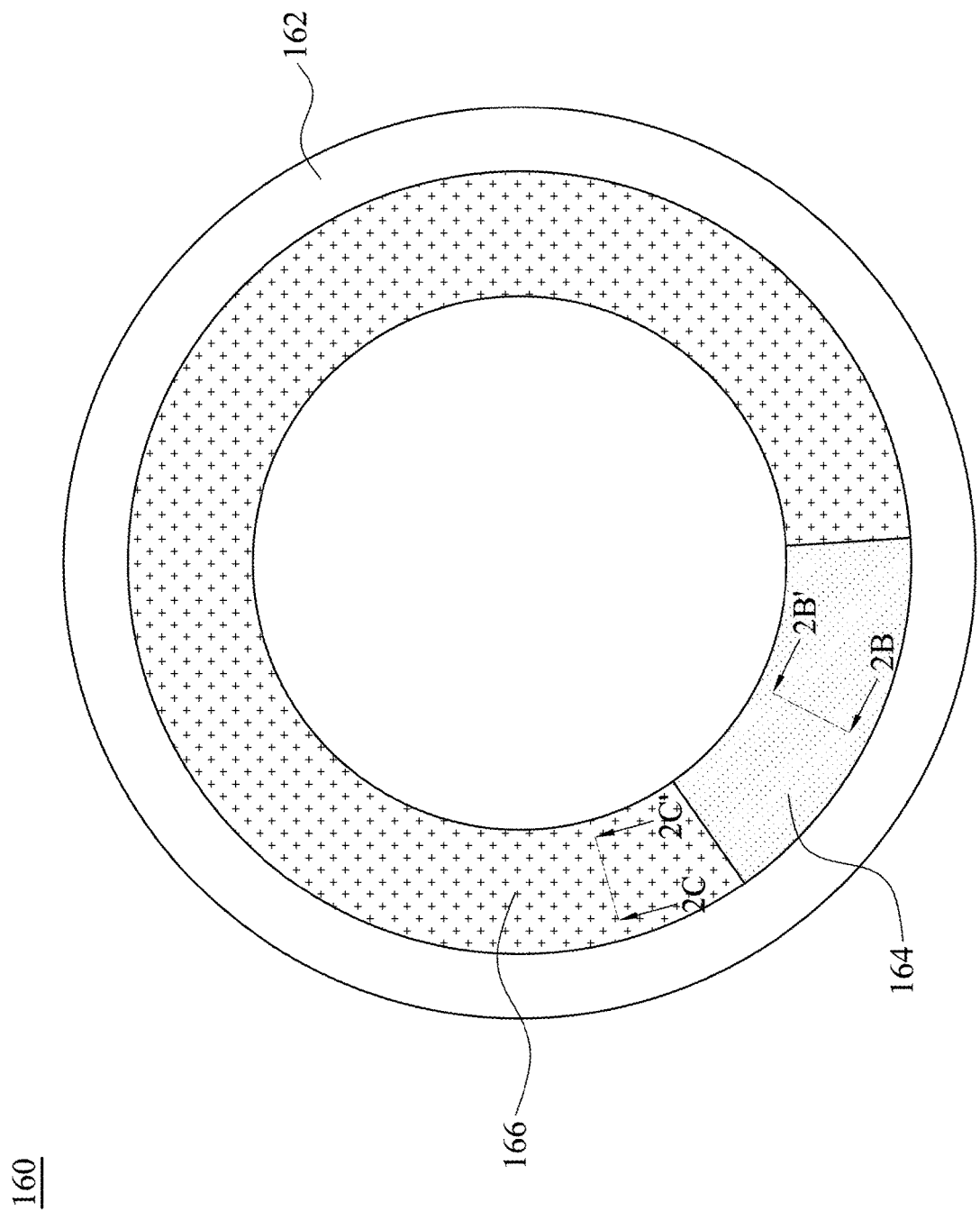
FIG. 2A is a top view of a phosphor wheel of a light source system according to a second embodiment of the present disclosure.
Figure 2C:
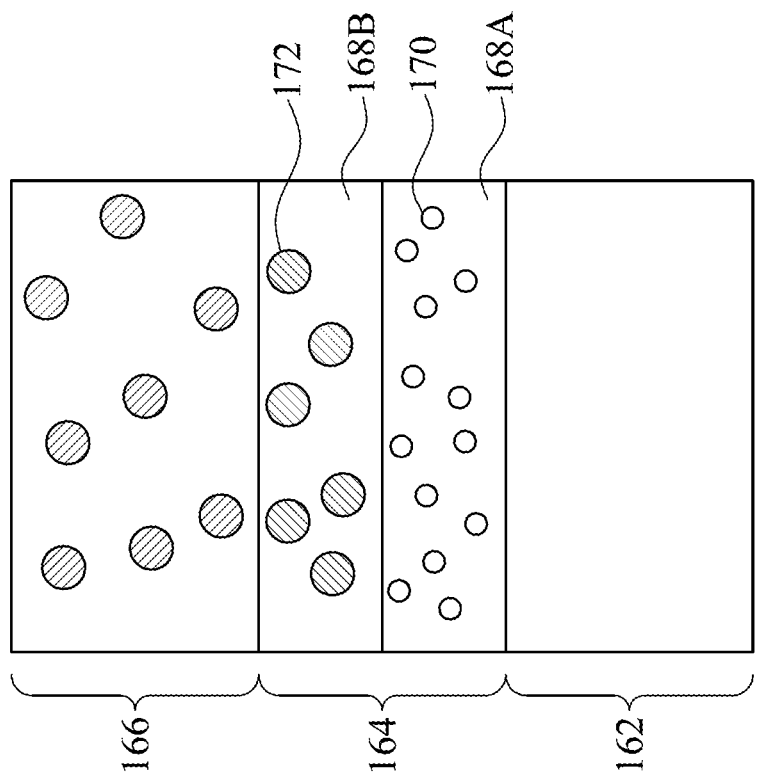
FIG. 2C is a cross-sectional view of the phosphor wheel shown in FIG. 2A taken along line 2C-2C'.
Figure 2B:
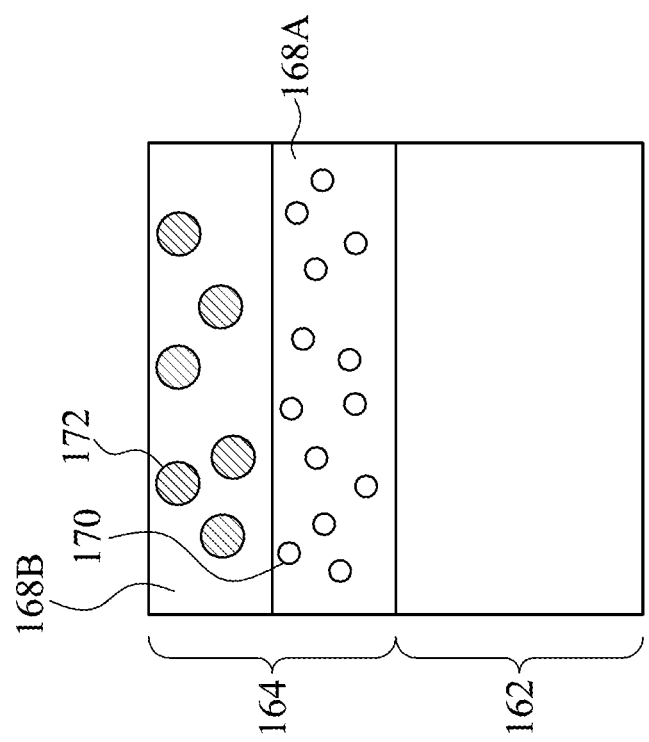
FIG. 2B is a cross-sectional view of the phosphor wheel shown in FIG. 2A taken along line 2B-2B'.

Reference is made to FIGS. 2A, 2B, and 2C. FIG. 2A is a top view of a phosphor wheel 160 of a light source system according to a second embodiment of the present disclosure. FIG. 2B is a cross-sectional view of the phosphor wheel 160 shown in FIG. 2A taken along line 2B-2B'. FIG. 2C is a cross-sectional view of the phosphor wheel 160 shown in FIG. 2A taken along line 2C-2C'. At least one difference between the present embodiment and the first embodiment is that heights of the scattering particles 170 relative to the substrate 162 are different from heights of the first photoluminescence particles 172 relative to the substrate 162 in the luminescence layer 164 of the present embodiment.

Specifically, the luminescence layer 164 of this embodiment may include glue layers 168A, 168B stacked each other. The scattering particles 170 are distributed in the glue layer 168A, and the first photoluminescence particles 172 are distributed in the glue layer 168B. This configuration can be achieved through two coatings. For example, the scattering particles 170 and the first photoluminescence particles 172 can be respectively prepared in different colloids, and then the colloid with the scattering particles 170 and the colloid with the first photoluminescence particles 172 are sequentially coated on the substrate 162. Since the scattering particles 170 and the first photoluminescence particles 172 are sequentially coated on the substrate 162, the heights of the scattering particles 170 relative to the substrate 162 will be smaller than the heights of the first photoluminescence particles 172 relative to the substrate 162.

In addition, for the scattering particles 170 and the first photoluminescence particles 172, the particles closer to the substrate 162 have a higher concentration. Furthermore, the glue layers 168A, 168B can be regarded as a first block and a second block of the luminescence layer 164, respectively. That is, the first block will be located between the substrate 162 and the second block, in which the scattering particles 170 are located in the first block, and the first photoluminescence particles 172 will be located in the second block. Under the configuration, since the scattering particles 170 are closer to the substrate 162 than the first photoluminescence particles 172, the particle concentration of the scattering particles 170 can be adjusted to be greater than the particle concentration of the first photoluminescence particles 172, so that the particle concentration in the first block of the luminescence layer 164 is greater than the particle concentration in the second block of the luminescence layer 164.

The phosphor wheel 160 thus configured can also achieve the aforementioned function of making the light beam provided by the luminescence layer 164 have a larger color gamut and modulating the light beam emitted by the light emitter 110. In addition, since these effects can be achieved by different manufacturing methods, the flexibility of the production of the phosphor wheel 160 can be improved. Moreover, the first wavelength conversion layer 166 is also disposed on the luminescence layer 164. A vertical projection of the first wavelength conversion layer 166 on the substrate 162 and a vertical projection of the luminescence layer 164 on the substrate 162 still overlap each other and form an overlapping area, and the overlapping area is smaller than an area of the vertical projection of the luminescence layer 164 on the substrate 162.

Figure 3A:
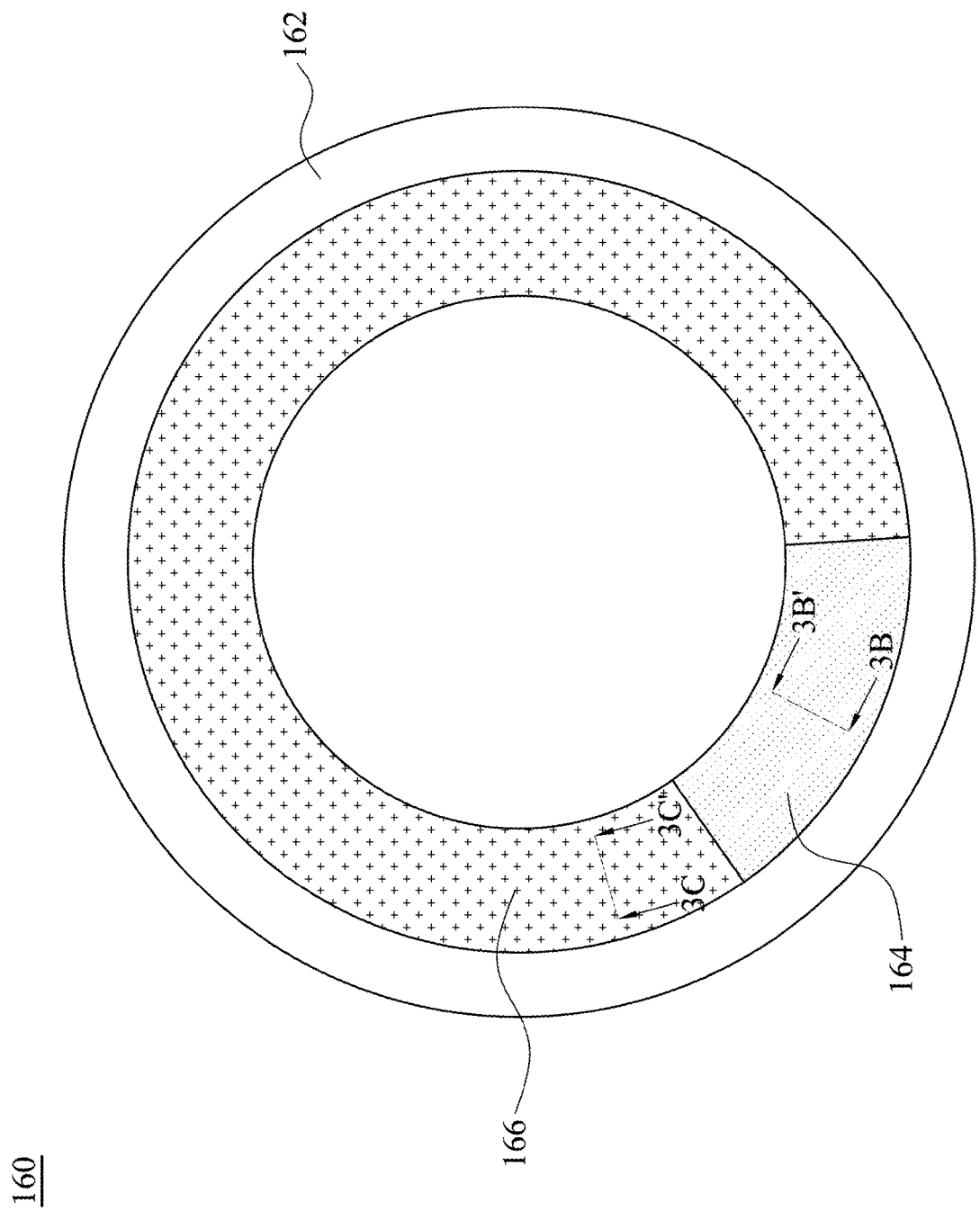
FIG. 3A is a top view of a phosphor wheel of a light source system according to a third embodiment of the present disclosure.
Figure 3C:
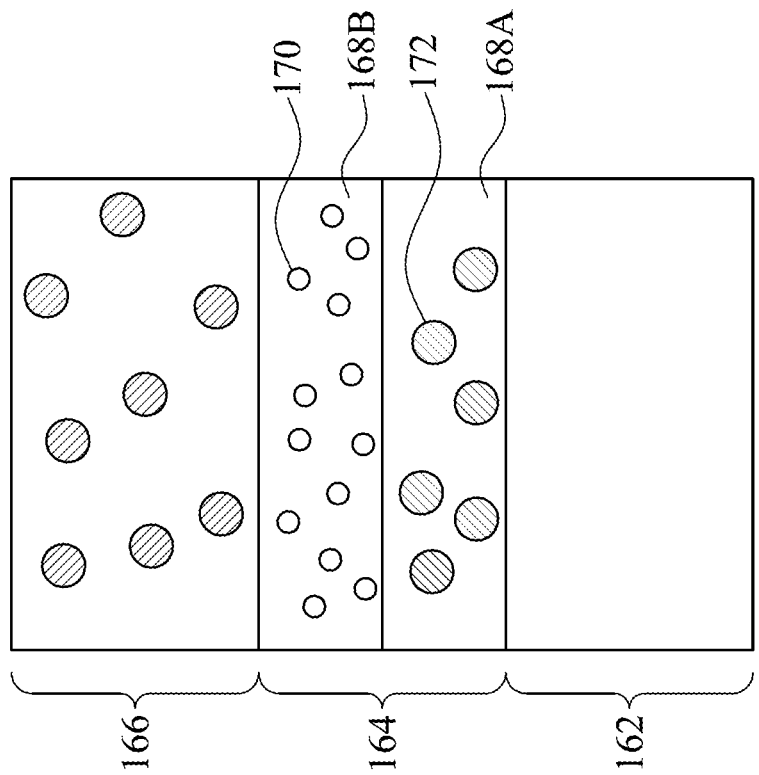
FIG. 3C is a cross-sectional view of the phosphor wheel shown in FIG. 3A taken along line 3C-3C'.
Figure 3B:
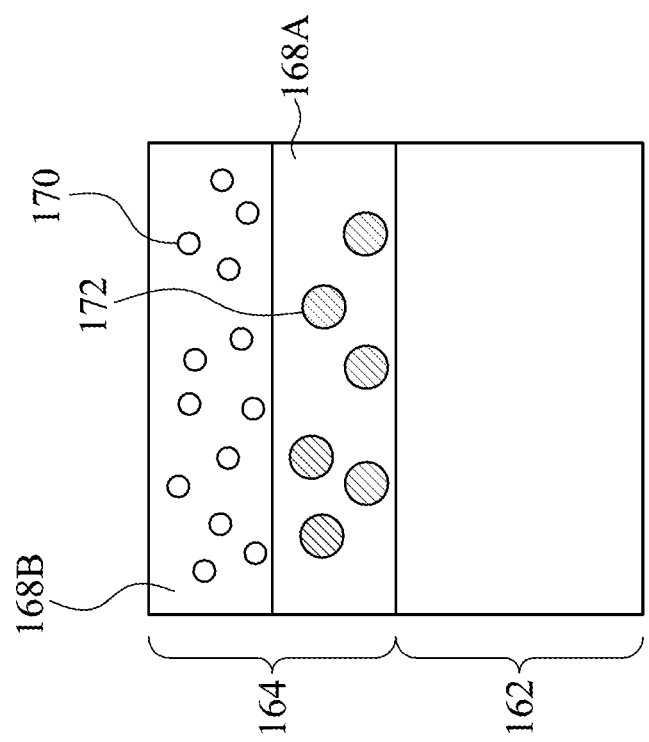
FIG. 3B is a cross-sectional view of the phosphor wheel shown in FIG. 3A taken along line 3B-3B'.

Reference is made to FIGS. 3A, 3B, and 3C. FIG. 3A is a top view of a phosphor wheel 160 of a light source system according to a third embodiment of the present disclosure. FIG. 3B is a cross-sectional view of the phosphor wheel 160 shown in FIG. 3A taken along line 3B-3B'. FIG. 3C is a cross-sectional view of the phosphor wheel 160 shown in FIG. 3A taken along line 3C-3C'. At least one difference between the present embodiment and the second embodiment is that the scattering particles 170 are distributed in the glue layer 168B and the first photoluminescence particles 172 are distributed in the glue layer 168A, such that the heights of the scattering particles 170 relative to the substrate 162 are greater than the heights of the first photoluminescence particles 172 relative to the substrate 162.

In other words, in the present embodiment, the first photoluminescence particles 172 will be located in the first block and the scattering particles 170 will be located in the second block. In this regard, the particle concentration of the first photoluminescence particles 172 is adjusted to be greater than the particle concentration of the scattering particles 170, such that the particle concentration in the first block of the luminescence layer 164 will still be greater than the particle concentration in the second block of the luminescence layer 164. Similarly, since these effects can be achieved by different manufacturing methods, the flexibility of manufacturing the phosphor wheel 160 can be improved. In addition, the configuration of the first wavelength conversion layer 166 may be similar to that of the foregoing embodiments, and details are not described herein again.

Figure 4A:
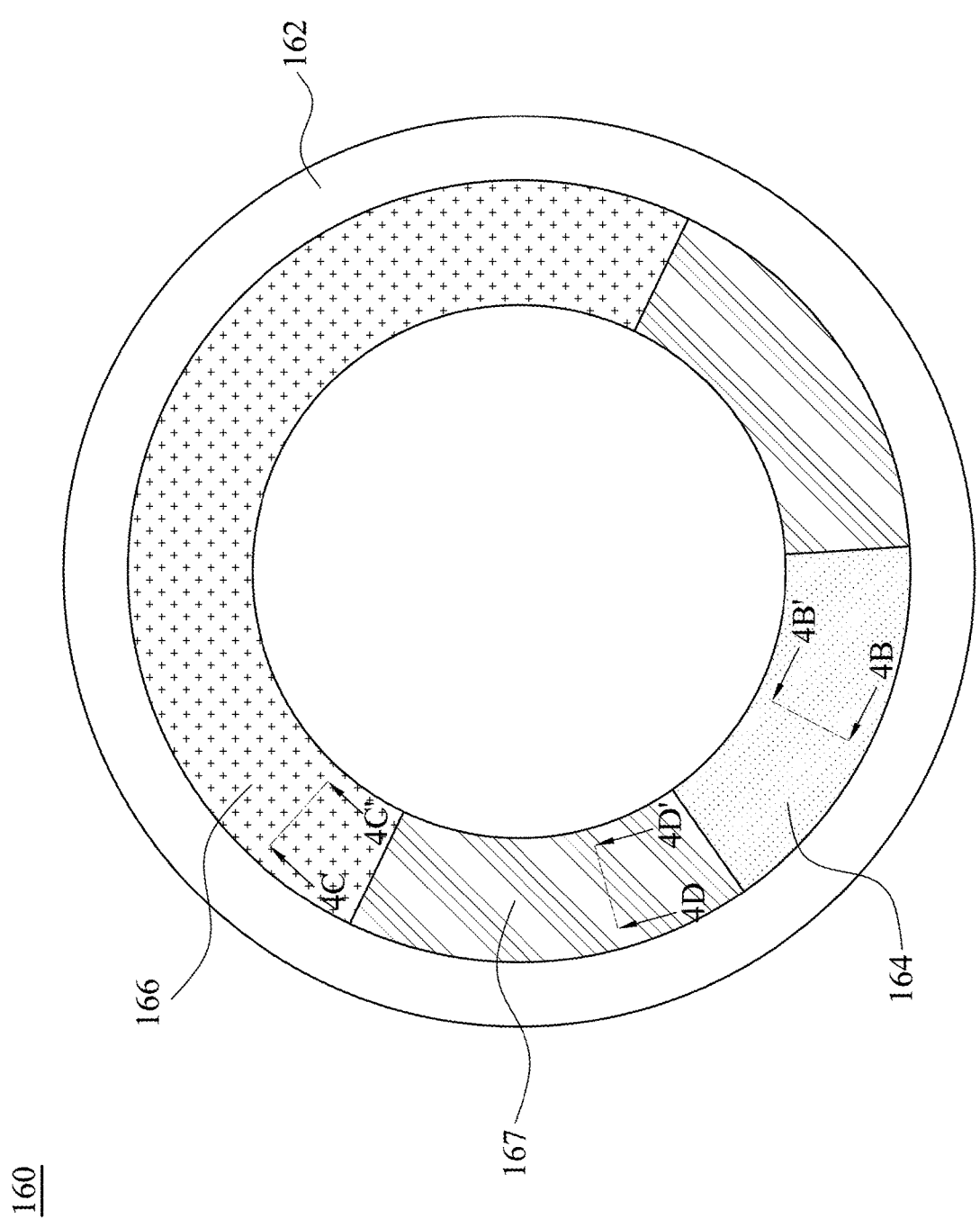
FIG. 4A is a top view of a phosphor wheel of a light source system according to a fourth embodiment of the present disclosure.
Figure 4D:
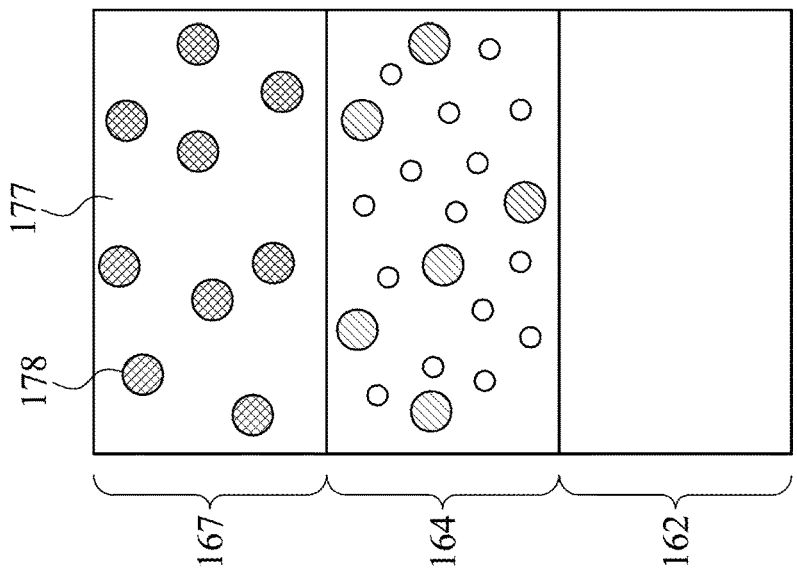
FIG. 4D is a cross-sectional view of the phosphor wheel shown in FIG. 4A taken along line 4D-4D'.
Figure 4C:
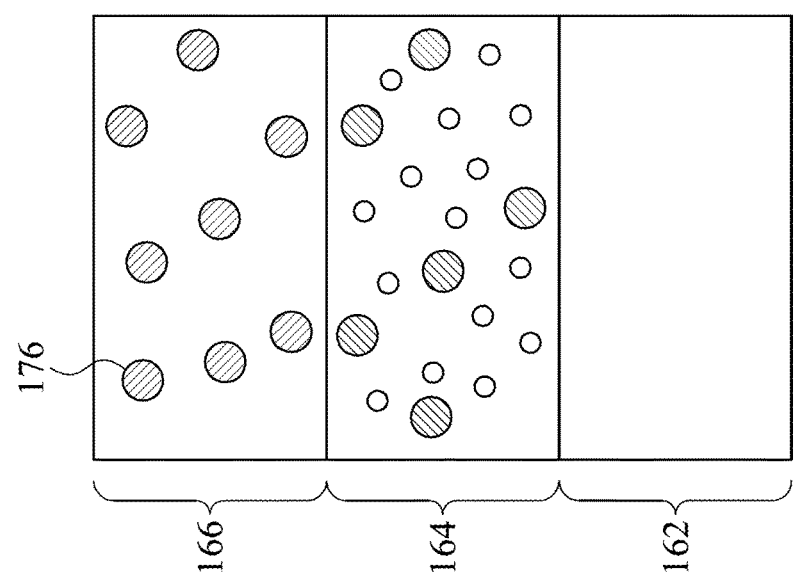
FIG. 4C is a cross-sectional view of the phosphor wheel shown in FIG. 4A taken along line 4C-4C'.
Figure 4B:
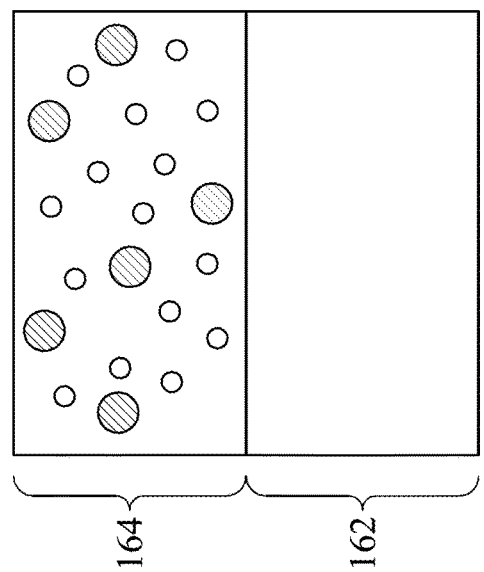
FIG. 4B is a cross-sectional view of the phosphor wheel shown in FIG. 4A taken along line 4B-4B'.

Reference is made to FIGS. 4A, 4B, 4C, and 4D. FIG. 4A is a top view of a phosphor wheel 160 of a light source system according to a fourth embodiment of the present disclosure. FIG. 4B is a cross-sectional view of the phosphor wheel 160 shown in FIG. 4A taken along line 4B-4B'. FIG. 4C is a cross-sectional view of the phosphor wheel 160 shown in FIG. 4A taken along line 4C-4C'. FIG. 4D is a cross-sectional view of the phosphor wheel 160 shown in FIG. 4A taken along line 4D-4D'. At least one difference between the present embodiment and the first embodiment is that the phosphor wheel 160 of the present embodiment further includes a second wavelength conversion layer 167. The second wavelength conversion layer 167 is disposed on the luminescence layer 164, and the first wavelength conversion layer 166 and the second wavelength conversion layer 167 are respectively located at different regions on an upper surface of the luminescence layer 164. The shape of the luminescence layer 164 disposed on the substrate 162 in top view will be a complete ring shape, and the shapes of the first wavelength conversion layer 166 disposed on the substrate 162 in top view will be partial ring shapes, such that at least a part of the upper surface of the luminescence layer 164 is not covered by the first wavelength conversion layer 166 or the second wavelength conversion layer 167.

The second wavelength conversion layer 167 includes a glue layer 177 and a plurality of third photoluminescence particles 178. The third photoluminescence particles 178 are distributed in the glue layer 177, and the third photoluminescence particles 178 and the second photoluminescence particles 176 generate different colored light after being excited. For example, in some embodiments, the second photoluminescence particles 176 and the third photoluminescence particles 178 generate red light and green light, respectively, after being excited.

With the configuration, since at least a part of the upper surface of the luminescence layer 164 is not covered by the first wavelength conversion layer 166 or the second wavelength conversion layer 167, when the phosphor wheel 160 is irradiated with blue light, the phosphor wheel 160 can still provide a mixed light of blue light and green light through the luminescence layer 164. The first wavelength conversion layer 166 and the second wavelength conversion layer 167 with the luminescence layer 164 as a reflective substrate provide red light and green light, respectively. In this way, the foregoing objectives of letting the light beam provided by the luminescence layer 164 to have a larger color gamut and modulating the light beam emitted by most of the existing light emitters 110 can still be achieved. In addition, in this embodiment, a plurality of regions not covered by the wavelength conversion layers may also be designed as required to obtain more modulated light in a time sequence.

According to the foregoing recitations of the embodiments of the disclosure, it can be seen that the phosphor wheel of the present disclosure includes a substrate, a luminescence layer, and a wavelength conversion layer. The luminescence layer is disposed on the substrate and includes a glue layer, a plurality of scattering particles, and a plurality of first photoluminescence particles. The scattering particles and the first photoluminescence particles are collectively distributed in the glue layer and serve as a reflective substrate for the phosphor wheel. The first wavelength conversion layer can be disposed on the luminescence layer and includes a plurality of second photoluminescence particles, in which the colored light generated by the first photoluminescence particle and the second photoluminescence particle are different when being excited. With this configuration, when the phosphor wheel is irradiated with blue light, the phosphor wheel can provide mixed light of blue light and other colored light through the luminescence layer. In this way, the light beam provided by the luminescence layer can have a larger color gamut, and the color of the light beam provided by the luminescence layer can be prevented from being excessively biased toward purple. On the other hand, the wavelength conversion layer with the luminescence layer as the reflective substrate can provide colored light other than blue light. The way of adjusting the optical characteristics of the luminescence layer by adding the first photoluminescence particles will not affect the wavelength conversion layer too much, which is beneficial to simplifying the parameter design of the first photoluminescence particles.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A phosphor wheel, comprising:
   a substrate; and
   a luminescence layer disposed on the substrate and comprising a glue layer, a plurality of scattering particles, and a plurality of first photoluminescence particles, the scattering particles and the first photoluminescence particles being collectively distributed in the glue layer, wherein at least one of the scattering particles is located between the substrate and at least one of the first photoluminescence particles, and at least another of the first photoluminescence particles is located between the substrate and at least another of the scattering particles,
   wherein after a light beam with a wavelength in a range from 430 nm to 460 nm is incident on the luminescence layer, a first wave peak exists at a wavelength of about 450 nm in a light emission spectrum of a light beam correspondingly emitted by the luminescence layer, a second wave peak exists at a wavelength in a range from 490 nm to 540 nm in the light emission spectrum, and a ratio of a peak brightness of the first wave peak to a peak brightness of the second wave peak is in a range from 2 to 36.

2. The phosphor wheel of claim 1, wherein diameters of the scattering particles are smaller than diameters of the first photoluminescence particles, and the diameters of the first photoluminescence particles are in a range from 10 μm to 15 μm.

3. The phosphor wheel of claim 1, wherein a weight percentage concentration of the first photoluminescence particles in the luminescence layer is in a range from 3% to 35%.

4. The phosphor wheel of claim 1, further comprising:
a first wavelength conversion layer disposed on the substrate or the luminescence layer and comprising a plurality of second photoluminescence particles, wherein an overlapping area formed by a vertical projection of the first wavelength conversion layer on the substrate and a vertical projection of the luminescence layer on the substrate is smaller than an area of the vertical projection of the luminescence layer on the substrate.

5. The phosphor wheel of claim 4, further comprising:
a second wavelength conversion layer disposed on the luminescence layer and comprising a plurality of third photoluminescence particles, wherein the first wavelength conversion layer and the second wavelength conversion layer are respectively located at different regions on an upper surface of the luminescence layer, and at least a part of the upper surface of the luminescence layer is not covered by the first wavelength conversion layer and the second wavelength conversion layer.

6. A light source system, comprising:
the phosphor wheel of claim 1;
a light emitter; and
a light reflector optically coupled between the light emitter and the phosphor wheel and having a reflective surface facing the phosphor wheel.

7. A phosphor wheel, comprising:
a substrate; and
a luminescence layer disposed on the substrate and comprising a glue layer, a plurality of scattering particles, and a plurality of first photoluminescence particles, the scattering particles and the first photoluminescence particles being collectively distributed in the glue layer, wherein the luminescence layer is configured to receive an excitation light and generate a modulated light, a light emission spectrum of the modulated light has a first peak brightness and a second peak brightness, wherein the first peak brightness is greater than the second peak brightness, and a ration of the first peak brightness to the second peak brightness is in a range from 2 to 36.

8. The phosphor wheel of claim 7, wherein a wavelength corresponding to a peak brightness of light generated by the first photoluminescence particles after receiving the excitation light is not less than a wavelength corresponding to a peak brightness of the excitation light.

9. The phosphor wheel of claim 7, wherein diameters of the first photoluminescence particles are in a range from 10 μm to 15 μm, and a weight percentage concentration of the first photoluminescence particles in the luminescence layer is in a range from 3% to 35%.

10. The phosphor wheel of claim 7, further comprising:
a first wavelength conversion layer disposed on the substrate or the luminescence layer and comprising a plurality of second photoluminescence particles, wherein an overlapping area formed by a vertical projection of the first wavelength conversion layer on the substrate and a vertical projection of the luminescence layer on the substrate is smaller than an area of the vertical projection of the luminescence layer on the substrate.

11. The phosphor wheel of claim 10, wherein a wavelength corresponding to a peak brightness of light generated by the second photoluminescence particles after receiving the excitation light is not less than a wavelength corresponding to a peak brightness of light generated by the first photoluminescence particles after receiving the excitation light.

* * * * *